US012025947B1

(12) United States Patent
Adams et al.

(10) Patent No.: US 12,025,947 B1
(45) Date of Patent: Jul. 2, 2024

(54) TONER CONTAINER LATCHING

(71) Applicant: LEXMARK INTERNATIONAL, INC., Lexington, KY (US)

(72) Inventors: Emily Stefano Adams, Lexington, KY (US); Brian Lester Boettcher, Versailles, KY (US); Brian Lee Hawes, Lexington, KY (US); Edward Lynn Triplett, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 0 days.

(21) Appl. No.: 18/138,322

(22) Filed: Apr. 24, 2023

Related U.S. Application Data

(60) Provisional application No. 63/449,162, filed on Mar. 1, 2023.

(51) Int. Cl.
*G03G 21/16* (2006.01)

(52) U.S. Cl.
CPC ..... *G03G 21/1647* (2013.01); *G03G 21/1676* (2013.01)

(58) Field of Classification Search
CPC ........... G03G 21/1647; G03G 21/1676; G03G 21/1842; G03G 2215/0665; G03G 2221/163
See application file for complete search history.

(56) References Cited

U.S. PATENT DOCUMENTS

| | | | |
|---|---|---|---|
| 5,758,233 | A | 5/1998 | Coffey et al. |
| 5,768,661 | A | 6/1998 | Coffey et al. |
| 6,301,456 | B1 | 10/2001 | Horrall et al. |
| 6,678,489 | B1 | 1/2004 | Carter et al. |
| 6,871,031 | B2 | 3/2005 | Blaine et al. |
| 7,136,609 | B2 | 11/2006 | Askren et al. |
| 7,321,739 | B1 | 1/2008 | Dawson et al. |
| 8,761,639 | B1 | 6/2014 | Leemhuis et al. |
| 8,867,966 | B2 | 10/2014 | Acosta et al. |
| 8,867,970 | B2 | 10/2014 | Acosta et al. |
| 9,104,135 | B2 | 8/2015 | Hackney |
| 9,164,425 | B2 | 10/2015 | Buchanan et al. |
| 9,261,851 | B2 | 2/2016 | Leemhuis et al. |

(Continued)

FOREIGN PATENT DOCUMENTS

WO WO-2021252005 A1 * 12/2021 ......... G03G 21/1647

OTHER PUBLICATIONS

U.S. Appl. No. 18/138,336, filed Apr. 24, 2023 (Adams et al.).

*Primary Examiner* — Sophia S Chen
(74) *Attorney, Agent, or Firm* — Justin M. Tromp

(57) ABSTRACT

A toner container according to one example embodiment includes a latch catch projecting upward on a top of a body of the toner container. The latch catch is spaced from a second longitudinal end of the body and positioned closer to the second longitudinal end of the body than to a first longitudinal end of the body. The latch catch includes a first contact surface that faces toward the second longitudinal end of the body for contacting a first corresponding surface of a latch in an image forming device to restrain the toner container along a longitudinal dimension of the toner container in a direction from the first longitudinal end of the body toward the second longitudinal end of the body when the toner container is in an installed position in the image forming device.

19 Claims, 9 Drawing Sheets

(56) References Cited

U.S. PATENT DOCUMENTS

| | | | |
|---|---|---|---|
| 9,285,758 | B1 | 3/2016 | Boettcher et al. |
| 9,291,989 | B1 | 3/2016 | Carpenter |
| 9,317,004 | B1 | 4/2016 | Boettcher et al. |
| 9,411,303 | B1 | 8/2016 | Boettcher |
| 9,989,917 | B1 | 6/2018 | Hale et al. |
| 10,175,643 | B1 | 1/2019 | Carpenter et al. |
| 10,474,093 | B1 | 11/2019 | Amann et al. |
| 10,782,643 | B2 | 9/2020 | Amann et al. |
| 10,809,661 | B1 | 10/2020 | Carpenter et al. |
| 11,287,770 | B2 | 3/2022 | Williamson |
| 2019/0302686 | A1* | 10/2019 | Mochizuki ......... G03G 21/1647 |

* cited by examiner

TONER CONTAINER LATCHING

CROSS REFERENCES TO RELATED APPLICATIONS

This application claims priority to U.S. Provisional Patent Application Ser. No. 63/449,162, filed Mar. 1, 2023, entitled "Toner Container Latching," the content of which is hereby incorporated by reference in its entirety.

BACKGROUND

1. Field of the Disclosure

The present disclosure relates generally to image forming devices and more particularly to toner container latching.

DESCRIPTION OF THE RELATED ART

During the electrophotographic printing process, an electrically charged rotating photoconductive drum is selectively exposed to a laser beam. The areas of the photoconductive drum exposed to the laser beam are discharged, creating an electrostatic latent image of a page to be printed on the photoconductive drum. Toner particles are then electrostatically picked up by the latent image on the photoconductive drum, creating a toned image on the drum. The toned image is transferred to the print media (e.g., paper) either directly by the photoconductive drum or indirectly by an intermediate transfer member. The toner is then fused to the media using heat and pressure to complete the print.

The image forming device's toner supply is typically stored in one or more replaceable units having a shorter lifespan than the image forming device. It is important that the replaceable units are precisely aligned within the image forming device. If the replaceable units are misaligned, toner ports may not seal properly, resulting in severe toner leakage, which can cause mechanical and print quality defects. Misalignment of the replaceable units may also cause one or more drive couplers of each replaceable unit to fail to properly mate with corresponding drive couplers in the image forming device, rendering rotatable components of the replaceable units inoperable, for example, to move toner. If the replaceable units are misaligned, the replaceable units may also fail to establish or maintain an electrical connection with the image forming device, preventing or interrupting electronics on the replaceable units from communicating with the image forming device and/or preventing or interrupting electrophotographic components, such as developer rolls, photoconductive drums, etc., from receiving a voltage from the image forming device's power supply required for the electrophotographic printing process. It is often desired for the replaceable units to be rigidly held in place after installation in the image forming device in order to prevent their positional alignment from being disturbed during operation. The requirement for tight positional control must be balanced with the need to permit a user to easily load and unload the replaceable units into and out of the image forming device. Accordingly, it will be appreciated that precise alignment of the replaceable units and relatively simple insertion and removal into and out of the image forming device is desired.

SUMMARY

A toner container for use in an image forming device according to one example embodiment includes a body having a top, a bottom, a first side and a second side positioned between a first longitudinal end and a second longitudinal end of the body. The first longitudinal end of the body leads during insertion of the toner container into the image forming device, and the second longitudinal end trails during insertion of the toner container into the image forming device. A longitudinal dimension of the toner container extends between the first longitudinal end of the body and the second longitudinal end of the body. The body has a reservoir for holding toner. An outlet port is positioned on the bottom of the body for exiting toner from the toner container. The outlet port is positioned closer to the first longitudinal end of the body than to the second longitudinal end of the body. A drive coupler is positioned on the first longitudinal end of the body for mating with a corresponding drive coupler in the image forming device when the toner container is installed in the image forming device for receiving rotational motion from the corresponding drive coupler in the image forming device. A latch catch projects upward on the top of the body. The latch catch is spaced from the second longitudinal end of the body and positioned closer to the second longitudinal end of the body than to the first longitudinal end of the body. The latch catch includes a first contact surface that faces toward the second longitudinal end of the body for contacting a first corresponding surface of a latch in the image forming device to restrain the toner container along the longitudinal dimension of the toner container in a direction from the first longitudinal end of the body toward the second longitudinal end of the body when the toner container is in an installed position in the image forming device.

Embodiments include those wherein the latch catch includes a second contact surface for contacting a second corresponding surface of the latch in the image forming device during insertion of the toner container into the image forming device to move the latch in the image forming device clear of the latch catch to permit installation of the toner container in the image forming device. The second contact surface of the latch catch is positioned closer to the first longitudinal end of the body than the first contact surface of the latch catch is to the first longitudinal end of the body. In some embodiments, the second contact surface of the latch catch faces toward the first longitudinal end of the body and the first side of the body. In some embodiments, the second contact surface of the latch catch is angled relative to the first contact surface of the latch catch and the longitudinal dimension of the toner container. In some embodiments, the second contact surface of the latch catch extends toward the first longitudinal end of the body from the first contact surface of the latch catch.

Embodiments include those wherein the outlet port and the latch catch are positioned closer to the first side of the body than to the second side of the body.

Embodiments include those wherein the first contact surface of the latch catch is orthogonal to the longitudinal dimension of the toner container.

A toner container for use in an image forming device according to another example embodiment includes a body having a top, a bottom, a first side and a second side positioned between a first longitudinal end and a second longitudinal end of the body. The first longitudinal end of the body leads during insertion of the toner container into the image forming device, and the second longitudinal end trails during insertion of the toner container into the image forming device. A longitudinal dimension of the toner container extends between the first longitudinal end of the body and the second longitudinal end of the body. The body has a reservoir for holding toner. An outlet port is positioned on the bottom of the body for exiting toner from the toner container. The outlet port is positioned closer to the first longitudinal end of the body than to the second longitudinal end of the body. The outlet port is positioned closer to the first side of the body than to the second side of the body. A drive coupler is positioned on the first longitudinal end of the body for mating with a corresponding drive coupler in the image forming device when the toner container is installed in the image forming device for receiving rotational motion from the corresponding drive coupler in the image forming device. A latch catch is positioned on the top of the body. The latch catch is positioned closer to the second longitudinal end of the body than to the first longitudinal end of the body. The latch catch includes a first contact surface that faces toward the second longitudinal end of the body and that is unobstructed to contact a first corresponding surface of a latch in the image forming device to restrain the toner container along the longitudinal dimension of the toner container in a direction from the first longitudinal end of the body toward the second longitudinal end of the body when the toner container is in an installed position in the image forming device. The latch catch includes a second contact surface that is unobstructed to contact a second corresponding surface of the latch in the image forming device during insertion of the toner container into the image forming device to move the latch in the image forming device clear of the latch catch to permit installation of the toner container in the image forming device. The second contact surface of the latch catch is positioned closer to the first side of the body than to the second side of the body.

A toner container for use in an image forming device according to another example embodiment includes a body having a top, a bottom, a first side and a second side positioned between a first longitudinal end and a second longitudinal end of the body. The first longitudinal end of the body leads during insertion of the toner container into the image forming device, and the second longitudinal end trails during insertion of the toner container into the image forming device. A longitudinal dimension of the toner container extends between the first longitudinal end of the body and the second longitudinal end of the body. The body has a reservoir for holding toner. An outlet port is positioned on the bottom of the body for exiting toner from the toner container. The outlet port is positioned closer to the first longitudinal end of the body than to the second longitudinal end of the body. The outlet port is positioned closer to the first side of the body than to the second side of the body. A drive coupler is positioned on the first longitudinal end of the body for mating with a corresponding drive coupler in the image forming device when the toner container is installed in the image forming device for receiving rotational motion from the corresponding drive coupler in the image forming device. A latch catch is positioned on the top of the body. The latch catch is spaced from the second longitudinal end of the body and positioned closer to the second longitudinal end of the body than to the first longitudinal end of the body. The latch catch includes a catch surface that faces toward the second longitudinal end of the body. The catch surface of the latch catch is oriented closer to orthogonal to the longitudinal dimension of the toner container than to parallel to the longitudinal dimension of the toner container. The latch catch includes a camming surface that faces toward the first longitudinal end of the body and the first side of the body. The camming surface of the latch catch is angled relative to the catch surface of the latch catch and the longitudinal dimension of the toner container. The camming surface of the latch catch is positioned closer to the first longitudinal end of the body than the catch surface of the latch catch is to the first longitudinal end of the body. The camming surface of the latch catch is positioned closer to the first side of the body than to the second side of the body.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense, and the scope of the present disclosure is defined only by the appended claims and their equivalents.

Figure 1:
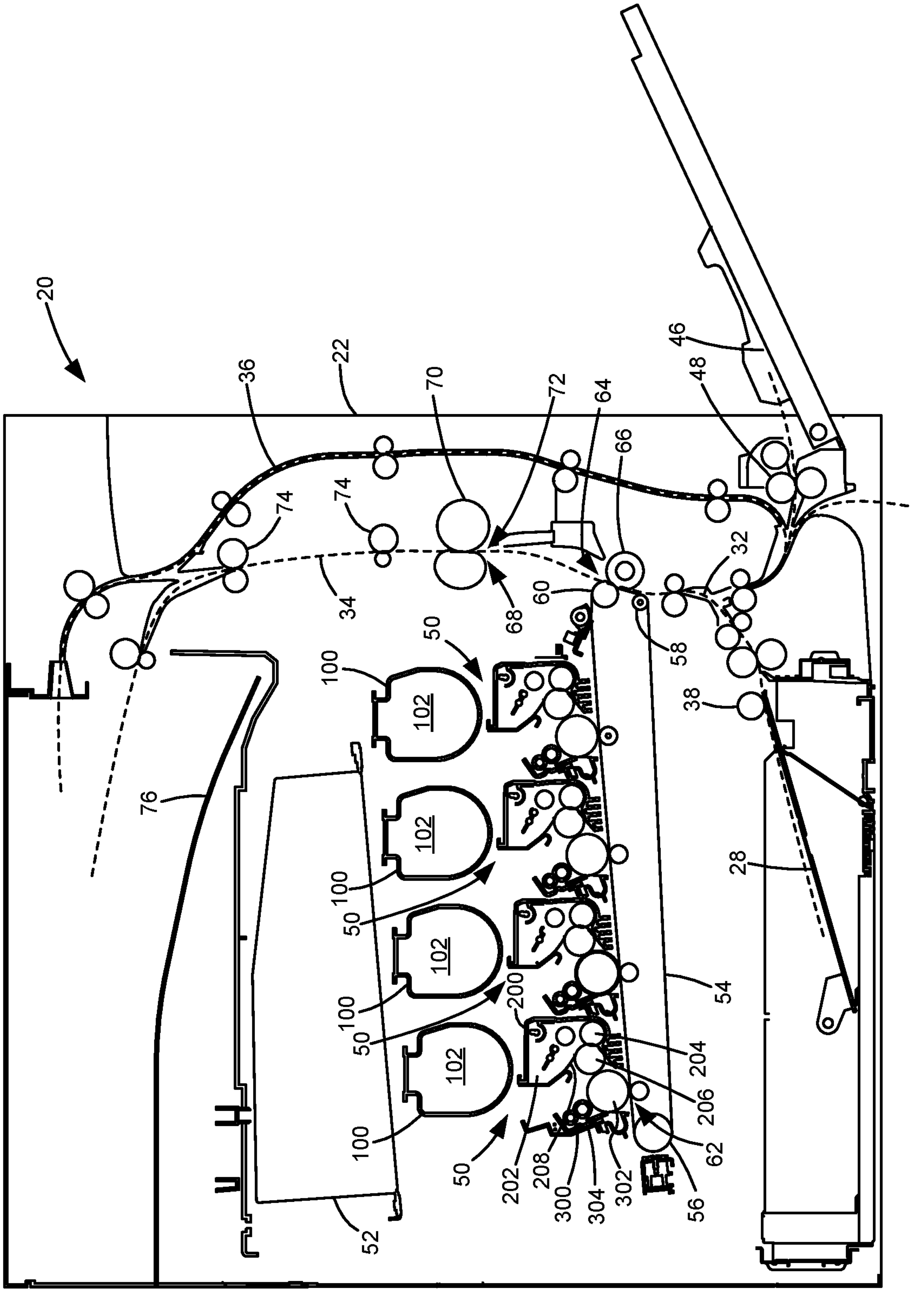
FIG. 1 is a schematic view of an image forming device according to one example embodiment.

FIG. 1 illustrates a schematic view of the interior of an example image forming device 20. Image forming device 20 includes a housing 22. Housing 22 includes one or more input trays 28 positioned therein. Each tray 28 is sized to contain a stack of media sheets. As used herein, the term media is meant to encompass not only paper but also labels, envelopes, fabrics, photographic paper and any other desired substrate. Trays 28 are preferably removable for refilling. A control panel may be located on housing 22. Using the control panel, a user is able to enter commands and generally control the operation of image forming device 20. For example, a user may enter commands to switch modes (e.g., color mode, monochrome mode), view the number of images printed, etc. A media path 32 extends through image forming device for moving the media sheets through the image transfer process. Media path 32 includes a simplex path 34 and may include a duplex path 36. A media sheet is introduced into simplex path 34 from tray 28 by a pick mechanism 38. In the example embodiment shown, pick mechanism 38 includes a roll positioned to move the media sheet from tray 28 and into media path 32. The media sheet is then moved along media path 32 by various transport rollers. Media sheets may also be introduced into media path 32 by a manual feed 46 having one or more rolls 48.

Image forming device 20 includes an image transfer section that includes one or more imaging stations 50. Each imaging station 50 includes a toner cartridge 100, a developer unit 200 and a photoconductive unit (PC unit) 300. Each toner cartridge 100 includes a reservoir 102 for holding toner and an outlet port in communication with an inlet port of a corresponding developer unit 200 for transferring toner from reservoir 102 to developer unit 200 as discussed in greater detail below. In the example embodiment illustrated, developer unit 200 utilizes what is commonly referred to as a single component development system. In this embodiment, each developer unit 200 includes a toner reservoir 202 and a toner adder roll 204 that moves toner from reservoir 202 to a developer roll 206. In another embodiment, developer unit 200 utilizes what is commonly referred to as a dual component development system. In this embodiment, toner in toner reservoir 202 is mixed with magnetic carrier beads. The magnetic carrier beads may be coated with a polymeric film to provide triboelectric properties to attract toner to the carrier beads as the toner and the magnetic carrier beads are mixed in the toner reservoir. In this embodiment, developer roll 206 attracts the magnetic carrier beads having toner thereon to developer roll 206 through the use of magnetic fields. Each PC unit 300 includes a charging roll 304 and a photoconductive (PC) drum 302 for each imaging station 50. PC drums 302 are mounted substantially parallel to each other. For purposes of clarity, developer unit 200 and PC unit 300 are labeled on only one of the imaging stations 50 in FIG. 1. In the example embodiment illustrated, each imaging station 50 is substantially the same except for the color of toner contained therein.

Each charging roll 304 forms a nip with the corresponding PC drum 302. During a print operation, charging roll 304 charges the surface of PC drum 302 to a specified voltage. A laser beam from a printhead 52 associated with each imaging station 50 is then directed to the surface of PC drum 302 and selectively discharges those areas it contacts to form a latent image. Developer roll 206 then transfers toner to PC drum 302 to form a toner image. A metering device, such as a doctor blade 208, may be used to meter toner on developer roll 206 and apply a desired charge to the toner prior to its transfer to PC drum 302. Toner is attracted to the areas of PC drum 302 surface discharged by the laser beam from printhead 52.

In the example embodiment illustrated, an intermediate transfer mechanism (ITM) 54 is disposed adjacent to imaging stations 50. In this embodiment, ITM 54 is formed as an endless belt trained about a drive roll 56, a tension roll 58 and a back-up roll 60. During print operations, ITM 54 moves past imaging stations 50 in a counterclockwise direction as viewed in FIG. 1. One or more of PC drums 302 apply toner images in their respective colors to ITM 54 at a first transfer nip 62. ITM 54 rotates and collects the one or more toner images from imaging stations 50 and then conveys the toner images to a media sheet advancing through simplex path 34 at a second transfer nip 64 formed between a transfer roll 66 and ITM 54, which is supported by back-up roll 60. In other embodiments, the toner image is transferred to the media sheet directly by the PC drum(s) 302.

The media sheet with the toner image is then moved along the media path 32 and into a fuser area 68. Fuser area 68 includes fusing rolls or belts 70 that form a nip 72 to adhere the toner image to the media sheet. The fused media sheet then passes through transport rolls 74 located downstream from fuser area 68, which move the media sheet to an output area 76 of image forming device 20 or to duplex path 36 for image formation on a second side of the media sheet, as desired.

A monocolor image forming device 20 may include a single imaging station 50, as compared to a color image forming device 20 that may include multiple imaging stations 50.

Figure 2:
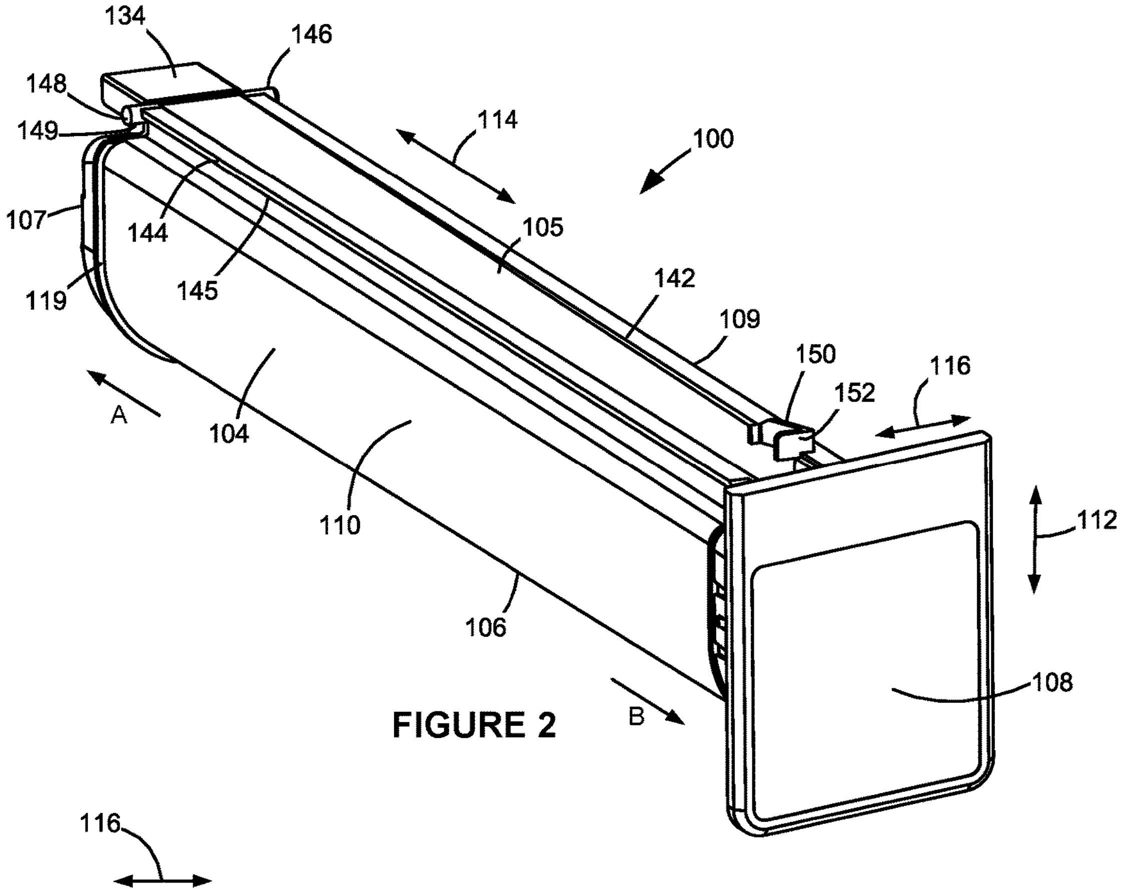
FIGS. 2 and 3 are perspective views of a toner cartridge according to one example embodiment.
Figure 3:
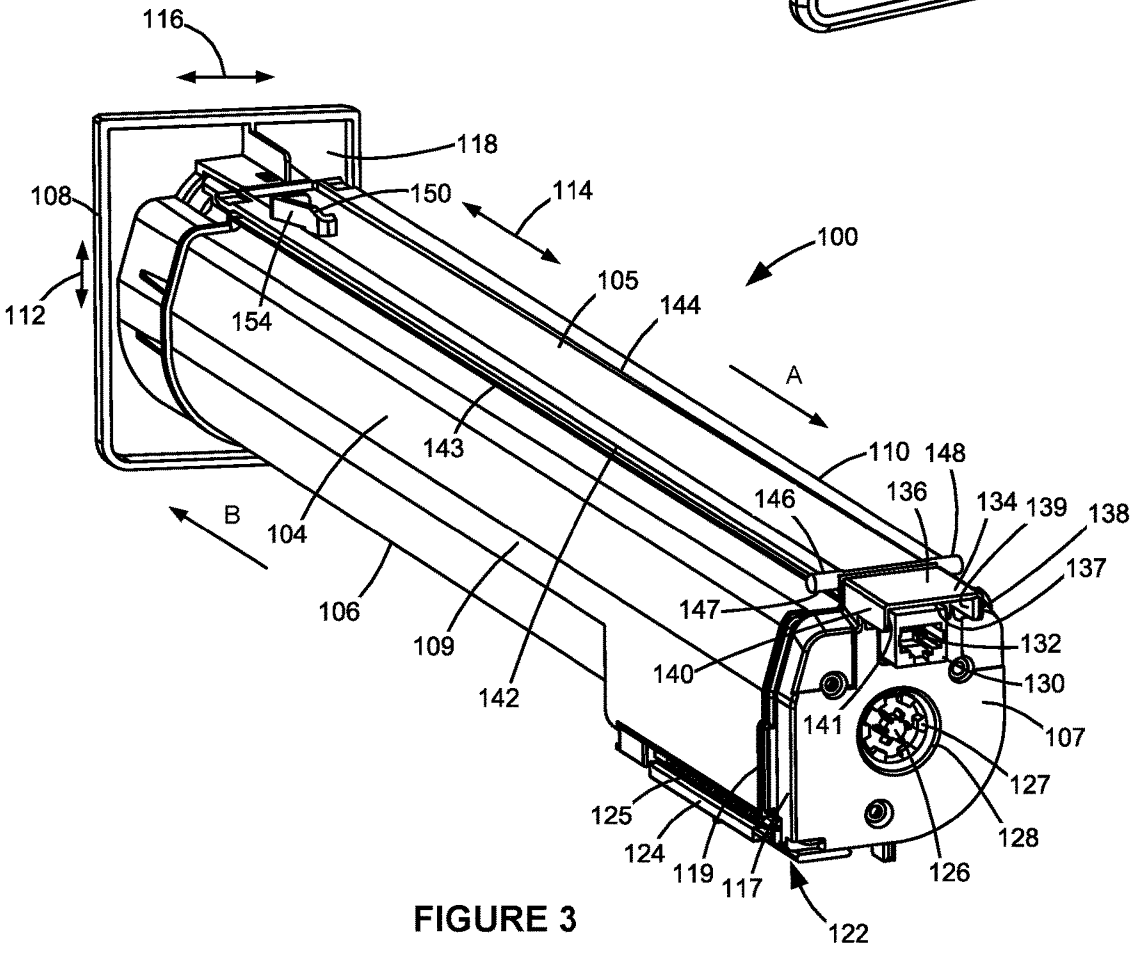
Figure 4:
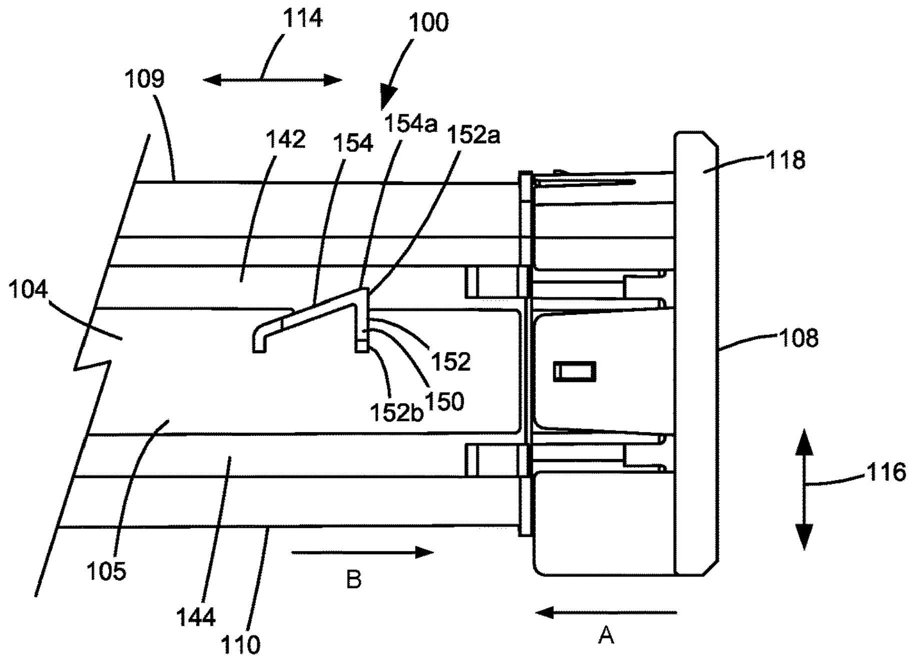
FIGS. 4 and 5 are a top plan view and a perspective view, respectively, of the toner cartridge shown in FIGS. 2 and 3 showing a latch catch of the toner cartridge according to one example embodiment.
Figure 5:
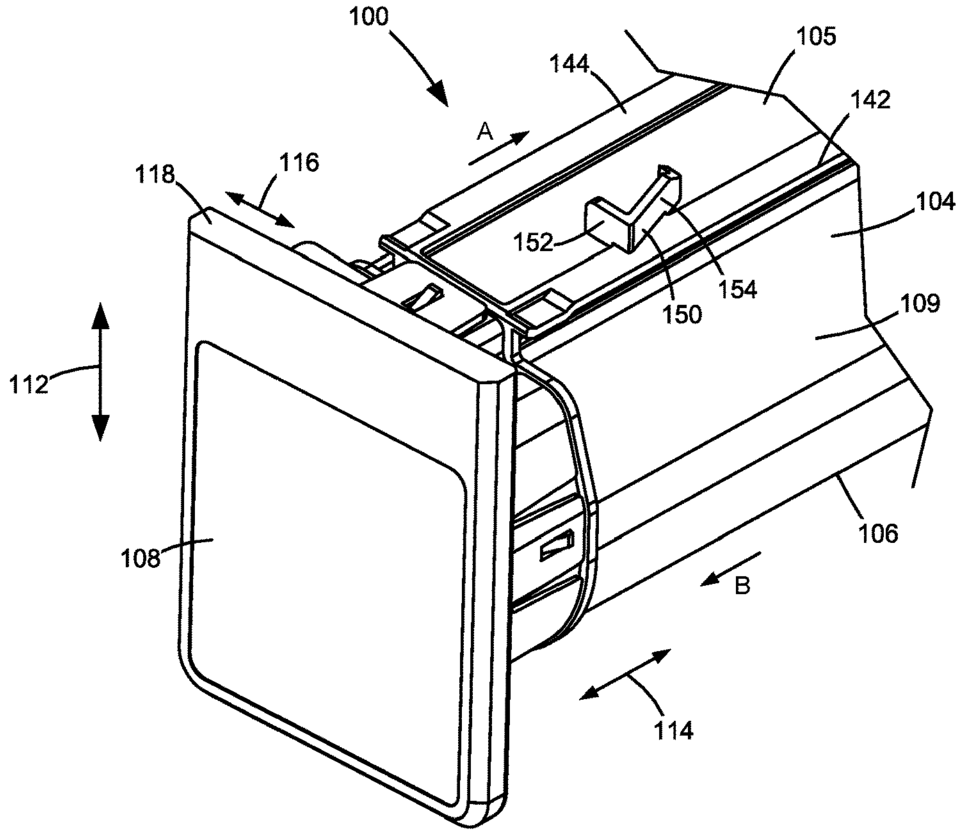

FIGS. 2 and 3 show toner cartridge 100 according to one example embodiment. Toner cartridge 100 includes a body 104 housing toner reservoir 102 therein. Body 104 includes a top 105, a bottom 106, a front end 107, a rear end 108 and a pair of sides 109, 110. Body 104 has a height measured along a vertical dimension 112 of toner cartridge 100 between top 105 and bottom 106, a length measured along a longitudinal dimension 114 of toner cartridge 100 orthogonal to vertical dimension 112 between front end 107 and rear end 108, and a width measured along a side-to-side dimension 116 of toner cartridge 100 orthogonal to vertical dimension 112 and longitudinal dimension 114 between side 109 and side 110, In the example embodiment illustrated, each end 107, 108 of body 104 includes a respective end cap 117, 118 mounted on a corresponding end wall, such as by suitable fasteners (e.g., screws, rivets, etc.) or by a snap-fit engagement. In this embodiment, end wall 119 at front end 107 and an end wall (not shown) at rear end 108 along with top 105, bottom 106 and sides 109, 110 form toner reservoir 102. In the example embodiment illustrated, toner cartridge 100 is inserted into image forming device 20 generally along longitudinal dimension 114 in the direction indicated by arrow A in FIGS. 2 and 3 with front end 107 of body 104 leading and rear end 108 of body 104 trailing, and toner cartridge 100 is removed from image forming device 20 generally along longitudinal dimension 114 in the direction indicated by arrow Bin FIGS. 2 and 3 with rear end 108 of body 104 leading and front end 107 of body 104 trailing.

As used herein, the terms "front" and "rear" correspond to the direction of travel of toner cartridge 100 during insertion of toner cartridge 100 into image forming device 20 rather than any particular orientation of image forming device 20. For example, in one embodiment, image forming device 20 is primarily operated, for example, accessing a user interface, media tray(s), supply item(s) (such as toner cartridge 100, developer unit 200, and PC unit 300) and other features of image forming device 20, at a side proximate to rear end 108 of body 104 of toner cartridge 100.

Toner cartridge 100 includes an outlet port 122 for transferring toner to an inlet port of developer unit 200. In the example embodiment illustrated, outlet port 122 is formed as a downward facing opening on bottom 106 of body 104, next to front end 107 of body 104, such as next to an inner side of end wall 119. In the example embodiment illustrated, outlet port 122 is positioned closer to side 109 of body 104 than to side 110 of body 104. Outlet port 122 may include a shutter 124 that regulates whether toner is permitted to flow from reservoir 102 out of outlet port 122. In the example embodiment illustrated, shutter 124 is biased toward a closed position blocking toner from exiting outlet port 122 by a biasing member, such as an extension spring 125, Installation of toner cartridge 100 moves shutter 124 from the closed position to an open position permitting toner to exit outlet port 172.

Toner cartridge 100 also includes a drive coupler 126 that mates with and receives rotational power from a corresponding drive coupler in image forming device 20 when toner cartridge 100 is installed in image forming device 20 in order to provide rotational power to various rotatable components of toner cartridge 100, such as toner agitators positioned within reservoir 102 for moving toner to outlet port 122. In the example embodiment illustrated, drive coupler 126 is positioned on front end 107 of body 104, for example, higher than outlet port 122. In the embodiment illustrated, drive coupler 126 is positioned on an outer surface of end wall 119 and exposed through an opening 128 in end cap 117 such that drive coupler 126 is unobstructed to mate with the corresponding drive coupler in image forming device 20 when toner cartridge 100 is installed in image forming device 20. In the embodiment illustrated, drive coupler 126 mates with the corresponding drive coupler in image forming device 20 at an axial end portion 127 of drive coupler 126 when toner cartridge 100 is installed in image forming device 20.

Toner cartridge 100 includes an electrical connector 130 having electrical contacts 132 that are matable with corresponding electrical contacts in image forming device 20 when toner cartridge 100 is installed in image forming device 20 for facilitating a communication link between processing circuitry of toner cartridge 100 and a controller of image forming device 20. The processing circuitry of toner cartridge 100 may provide authentication functions, safety and operational interlocks, operating parameters and/or usage information related to toner cartridge 100. The processing circuitry of toner cartridge 100 may include hardware and/or software logic, as desired. For example, the processing circuitry of toner cartridge 100 may include an application-specific integrated circuit (ASIC) and/or a microprocessor or the like as well as accompanying memory, for example, non-volatile and/or volatile memory, as desired.

In the example embodiment illustrated, electrical connector 130 and electrical contacts 132 are positioned on front end 107 of body 104. In this embodiment, electrical contacts 132 are unobstructed on front end 107 to mate with corresponding electrical contacts in image forming device 20 when toner cartridge 100 is installed in image forming device 20. In the example embodiment illustrated, electrical connector 130 and electrical contacts 132 are positioned higher than drive coupler 126, near top 105 of housing 104. In this embodiment, electrical connector 130 and electrical contacts 132 are vertically aligned with drive coupler 126 as illustrated in FIG. 3.

In the example embodiment illustrated, toner cartridge 100 also includes an alignment guide 134 that contacts a corresponding electrical connector in image forming device during insertion of toner cartridge 100 into image forming device 20 in order to move the corresponding electrical connector in image forming device 20 into alignment with electrical connector 130 of toner cartridge 100. Alignment guide 134 is positioned on front end 107 of body 104 in this embodiment. Alignment guide 134 may be positioned at top 105 of body 104. In the example embodiment illustrated, alignment guide 134 is positioned above electrical connector 130 and electrical contacts 132. In the example embodiment illustrated, alignment guide 134 is vertically aligned with electrical connector 130 and electrical contacts 132. Alignment guide 134 extends forward, for example, in a cantilevered manner, from front end 107 of body 104 along longitudinal dimension 114 in the direction of insertion A of toner cartridge 100 into image forming device 20. Alignment guide 134 extends further forward along longitudinal dimension 114 than electrical contacts 132 in order to contact the corresponding electrical connector in image forming device 20 prior to electrical connector 130 contacting the corresponding electrical connector in image forming device 20 during insertion of toner cartridge 100 into image forming device 20.

In the example embodiment illustrated, alignment guide 134 includes an awning projecting along longitudinal dimension 114 from front end 107 of body 104. In this embodiment, alignment guide 134 includes an upper ledge or guide member 136 having a bottom contact surface 137 positioned to contact the corresponding electrical connector in image forming device 20 during insertion of toner cartridge 100 into image forming device 20 in order to align the corresponding electrical connector in image forming device with electrical connector 130 along vertical dimension 112. Bottom contact surface 137 faces downward, toward electrical connector 130 and electrical contacts 132. In this embodiment, bottom contact surface 137 of upper guide member 136 is positioned higher than electrical connector 130 and electrical contacts 132. In the example embodiment illustrated, upper guide member 136 is formed as a substantially horizontal projection from front end 107 above electrical connector 130 and electrical contacts 132.

In the example embodiment illustrated, alignment guide 134 includes a first side ledge or guide member 138 and may include a second side ledge or guide member 140. Each side guide member 138, 140 includes a respective inner side contact surface 139, 141. Each inner side contact surface 139, 141 faces toward an opposite side 109, 110 of body 104 along side-to-side dimension 116 with inner side contact surfaces 139, 141 facing toward each other. In the example embodiment illustrated, inner side contact surface 139 of side guide member 138 is positioned closer to side 110 of body 104 than to side 109 of body 104, and inner side contact surface 141 of side guide member 140 is positioned closer to side 109 of body 104 than to side 110 of body 104. In this embodiment, inner side contact surface 139 of side guide member 138 is positioned closer to side 110 of body 104 than electrical connector 130 and electrical contacts 132 are to side 110 of body 104, and inner side contact surface 141 of side guide member 140 is positioned closer to side 109 of body 104 than electrical connector 130 and electrical contacts 132 are to side 109 of body 104.

Inner side contact surface 139 of side guide member 138 is positioned to contact the corresponding electrical connector in image forming device 20 during insertion of toner cartridge 100 into image forming device 20 in order to align the corresponding electrical connector in image forming device 20 with electrical connector 130 along side-to-side dimension 116. In the example embodiment illustrated, side guide member 140 provides symmetry and structural support for upper guide member 134. Inner side contact surface 141 of side guide member 140 may also help prevent overtravel of the corresponding electrical connector in image forming device 20 during mating with electrical connector 130. In the example embodiment illustrated, each side guide member 138, 140 is formed as a substantially vertical projection from front end 107 that extends downward from upper guide member 136.

In the example embodiment illustrated, toner cartridge 100 includes a pair of guide rails 142, 144 that extend along longitudinal dimension 114 of toner cartridge 100 at top 105 of body 104. In this embodiment, guide rails 142, 144 are formed as cantilevered extensions that extend outward in opposite directions along side-to-side dimension 116 of toner cartridge 100 at top 105 of body 104. Specifically, guide rail 142 extends along side-to-side dimension 116 toward side 109 of body 104, and guide rail 144 extends along side-to-side dimension 116 toward side 110 of body 104. Each guide rail 142, 144 includes a bottom contact surface 143, 145 that is positioned to contact and ride along the top surface of a corresponding guide rail positioned at an entrance of toner cartridge 100 to image forming device 20 during insertion of toner cartridge 100 into image forming device 20 in order to guide insertion of toner cartridge 100 into image forming device 20 in the direction indicated by arrow A in FIGS. 2 and 3 with front end 107 of body 104 leading and rear end 108 of body 104 trailing. In the example embodiment illustrated, guide rails 142, 144 run along nearly the entire length of body 104 of toner cartridge 100 along longitudinal dimension 114 of toner cartridge 100, from end wall 119 at front end 107 of body 104 to an inner end of end cap 118 at rear end 108 of body 104.

In the example embodiment illustrated, respective guide pins or posts 146, 148 project outward in opposite directions along side-to-side dimension 116 of toner cartridge 100 at a front end of each guide rail 142, 144. Specifically, guide post 146 extends along side-to-side dimension 116 toward side 109 of body 104, and guide post 148 extends along side-to-side dimension 116 toward side 110 of body 104. Guide posts 146, 148 extend further outward along side-to-side dimension 116 of toner cartridge 100 than guide rails 142, 144. In this embodiment, guide posts 146, 148 are positioned at end wall 119 at front end 107 of body 104. Each guide post 146, 148 includes a bottom contact surface 147, 149 that is positioned to contact and ride along the top surface of a corresponding guide rail that runs along the length of a guide slot that receives toner cartridge 100 in image forming device 20 during insertion of toner cartridge 100 into image forming device 20 in order to further guide insertion of toner cartridge 100 into image forming device 20 in the direction indicated by arrow A in FIGS. 2 and 3.

Contact between bottom contact surfaces 143, 145 of guide rails 142, 144 of toner cartridge 100 and the top surfaces of corresponding guide rails positioned at an entrance to image forming device 20 and between bottom contact surfaces 147, 149 of guide posts 146, 148 of toner cartridge 100 and the top surfaces of corresponding guide rails that run along the length of a guide slot that receives toner cartridge 100 in image forming device 20 controls the position of toner cartridge 100 along vertical dimension 112 during insertion of toner cartridge 100 into image forming device 20 and removal of toner cartridge 100 from image forming device 20 and may aid in positioning toner cartridge 100 along vertical dimension 112 when toner cartridge 100 is in its final installed position in image forming device 20. Contact between guide rails 142, 144 and guide posts 146, 148 of toner cartridge 100 and their corresponding guide rails in image forming device 20 may also aid in controlling the position of toner cartridge 100 along side-to-side dimension 116 and limiting rotation of toner cartridge 100 during insertion of toner cartridge 100 into image forming device 20 and removal of toner cartridge 100 from image forming device 20.

With reference to FIGS. 2-5, toner cartridge 100 includes a latch catch 150 positioned on top 105 of body 104, spaced from and near rear end 108 of body 104, such as, for example, closer to rear end 108 of body 104 than to front end 107 of body 104. In the example embodiment illustrated, latch catch 150 is formed as an upward projection from top 105 of body 104. In the example embodiment illustrated, latch catch 150 is positioned closer to side 109 of body 104 than to side 110 of body 104. Latch catch 150 restrains toner cartridge 100 in the direction of removal B of toner cartridge 100 from image forming device 20 when toner cartridge 100 is fully installed in image forming device 20 in order to control the position of toner cartridge 100 along longitudinal dimension 114 when toner cartridge is in its final installed position in image forming device 20.

Latch catch 150 includes a catch surface 152 on top 105 of body 104 that faces toward rear end 108 of body 104. Catch surface 152 is spaced from and positioned near rear end 108 of body 104, such as, for example, closer to rear end 108 of body 104 than to front end 107 of body 104. In the example embodiment illustrated, catch surface 152 is positioned closer to side 109 of body 104 than to side 110 of body 104. In the example embodiment illustrated, catch surface 152 of latch catch 150 is substantially orthogonal to longitudinal dimension 114 of toner cartridge 100 and substantially parallel to side-to-side dimension 116 of toner cartridge 100. In other embodiments, catch surface 152 faces primarily toward rear end 108 of body 104 such that catch surface 152 is oriented closer to orthogonal to longitudinal dimension 114 of toner cartridge 100 than to parallel to longitudinal dimension 114 of toner cartridge 100. In the example embodiment illustrated, catch surface 152 is substantially vertical, but catch surface 152 may be angled upward or downward in other embodiments. Catch surface 152 is positioned to contact a corresponding latching surface of a latch in image forming device 20 in order to restrain toner cartridge 100 in the direction of removal B of toner cartridge 100 from image forming device 20 when toner cartridge 100 is fully installed in image forming device 20 as discussed in greater detail below.

Latch catch 150 also includes a camming surface 154 on top 105 of body 104. Camming surface 154 faces toward front end 107 and toward side 109 of body 104, such as primarily toward side 109 of body 104 such that camming surface 154 is oriented closer to parallel to longitudinal dimension 114 of toner cartridge 100 than to orthogonal to longitudinal dimension 114 of toner cartridge 100. In the example embodiment illustrated, camming surface 154 is positioned closer to side 109 of body 104 than to side 110 of body 104. Camming surface 154 is positioned closer to front end 107 of body 104 than catch surface 152 is to front end 107 of body 104. In the example embodiment illustrated, camming surface 154 is angled relative to catch surface 152 and to longitudinal dimension 114 and side-to-side dimension 116 of toner cartridge 100. In the embodiment illustrated, camming surface 154 extends forward, toward front end 107 of body 104, from catch surface 152. For example, in this embodiment, catch surface 152 includes a first end **152*a* positioned proximate to side 109 of body 104 and a second end 152*b* positioned proximate to side 110 of body 104. A first end 154*a* of camming surface 154 adjoins first end 152*a* of catch surface 152, and camming surface 154 extends away from first end 152*a* of catch surface 152 toward front end 107 and side 110 of body 104. In the example embodiment illustrated, camming surface 154 is substantially vertical, but camming surface 154 may be angled upward or downward in other embodiments. Camming surface 154 is positioned to contact a corresponding camming surface of a latch in image forming device 20 during insertion of toner cartridge 100 into image forming device 22** in order to move the latch in image forming device 20 clear of latch catch 150 in order to permit installation of toner cartridge 100 in image forming device 20 as discussed in greater detail below.

Figure 6:
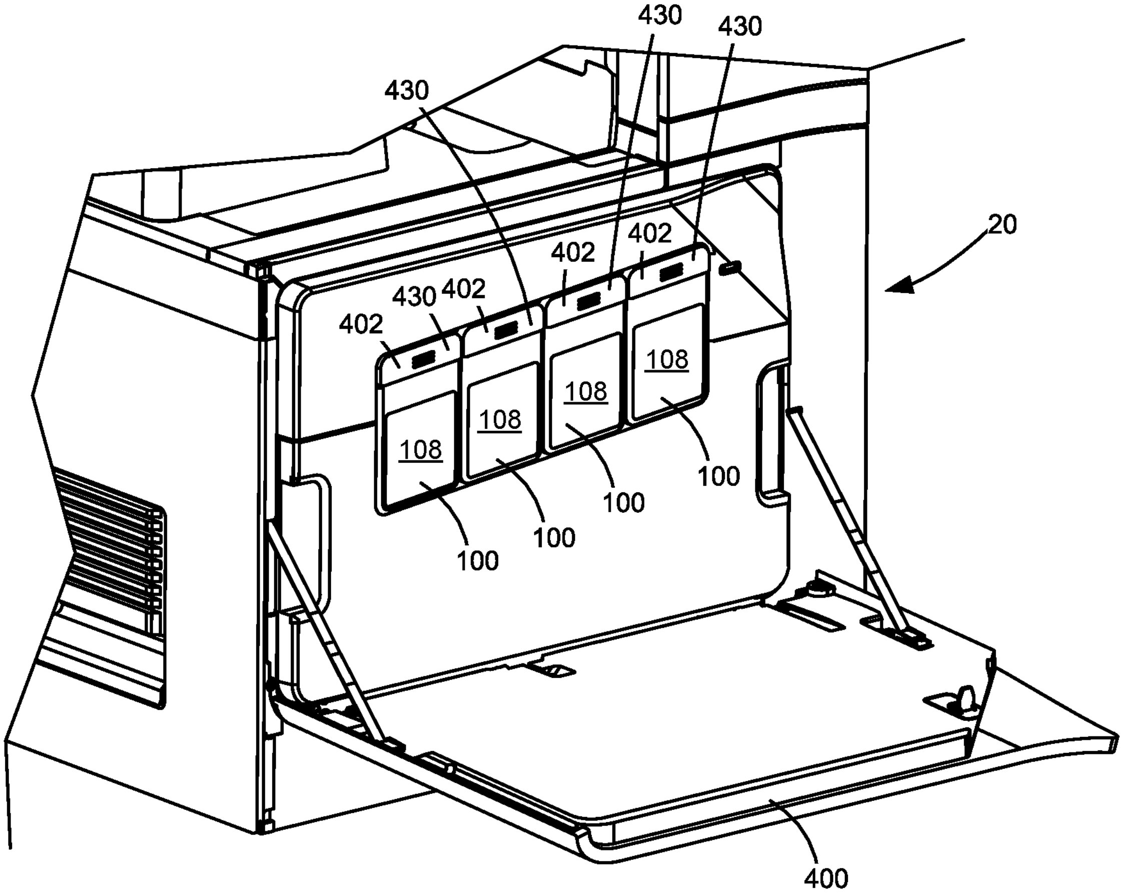
FIG. 6 is a perspective view of the image forming device with an access door of the image forming device in an open position showing four toner cartridges installed in the image forming device according to one example embodiment.

FIG. 6 shows image forming device 20 with an access door 400 of image forming device 20 in an open position permitting a user to access toner cartridges 100 installed in image forming device 20. In the example embodiment illustrated, a rear end 108 of each toner cartridge 100 is exposed to the user when toner cartridges 100 are installed in image forming device 20 and access door 400 is in the open position. In this embodiment, image forming device 20 includes a latch actuator 402 corresponding to each toner cartridge 100 that is exposed to the user when access door 400 is in the open position. As discussed in greater detail below, pressing latch actuator 402 inward along longitudinal dimension 114 releases the corresponding toner cartridge 100 from a latch of image forming device 20, allowing a user to remove the corresponding toner cartridge 100 from image forming device 20 for replacement.

FIGS. 7-11 show a latch 404 of image forming device 20 engaged with latch catch 150 of toner cartridge 100 when toner cartridge 100 is installed in image forming device 20. As discussed in greater detail below, engagement between latch 404 of image forming device 20 and latch catch 150 of toner cartridge 100 restrains toner cartridge 100 along longitudinal dimension 114 when toner cartridge 100 is installed in image forming device 20 and controls the position of toner cartridge 100 along longitudinal dimension 114 during operation.

Figure 9:
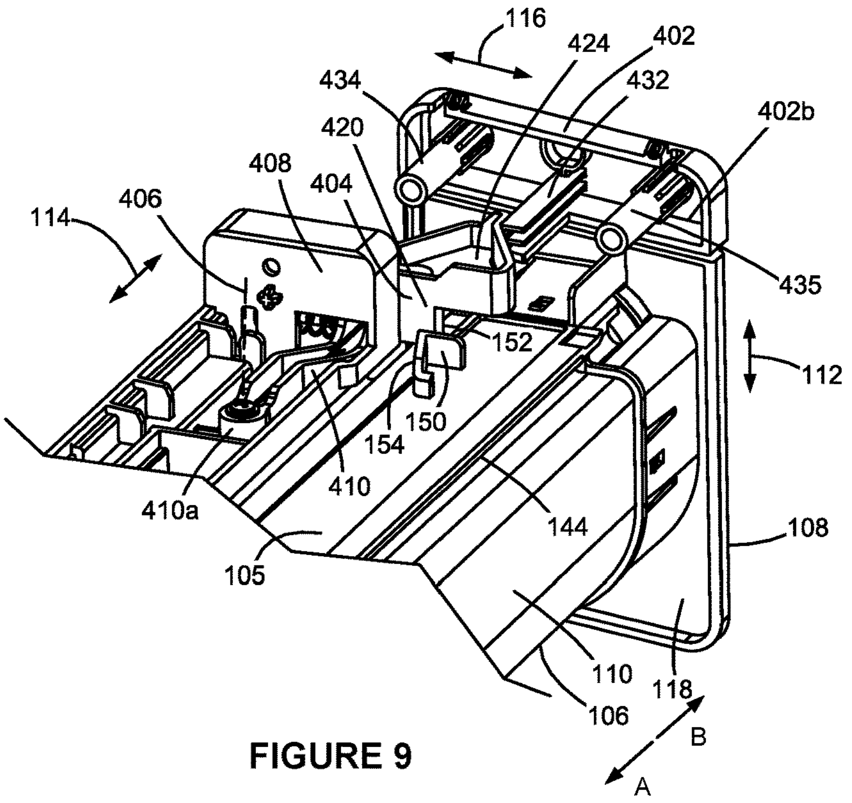
Figure 10:
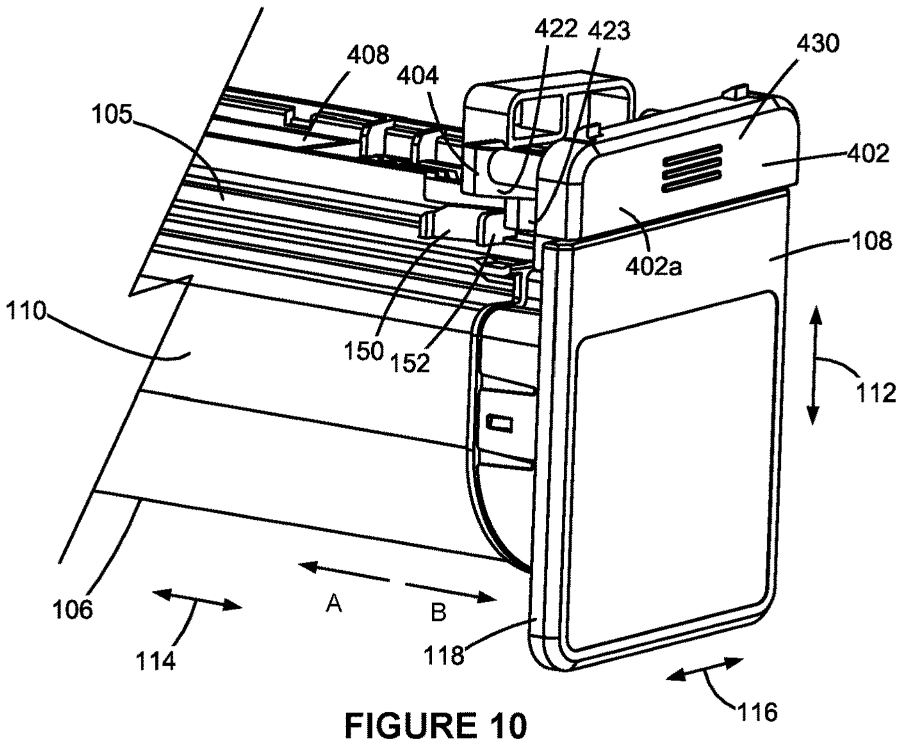
Figure 11:
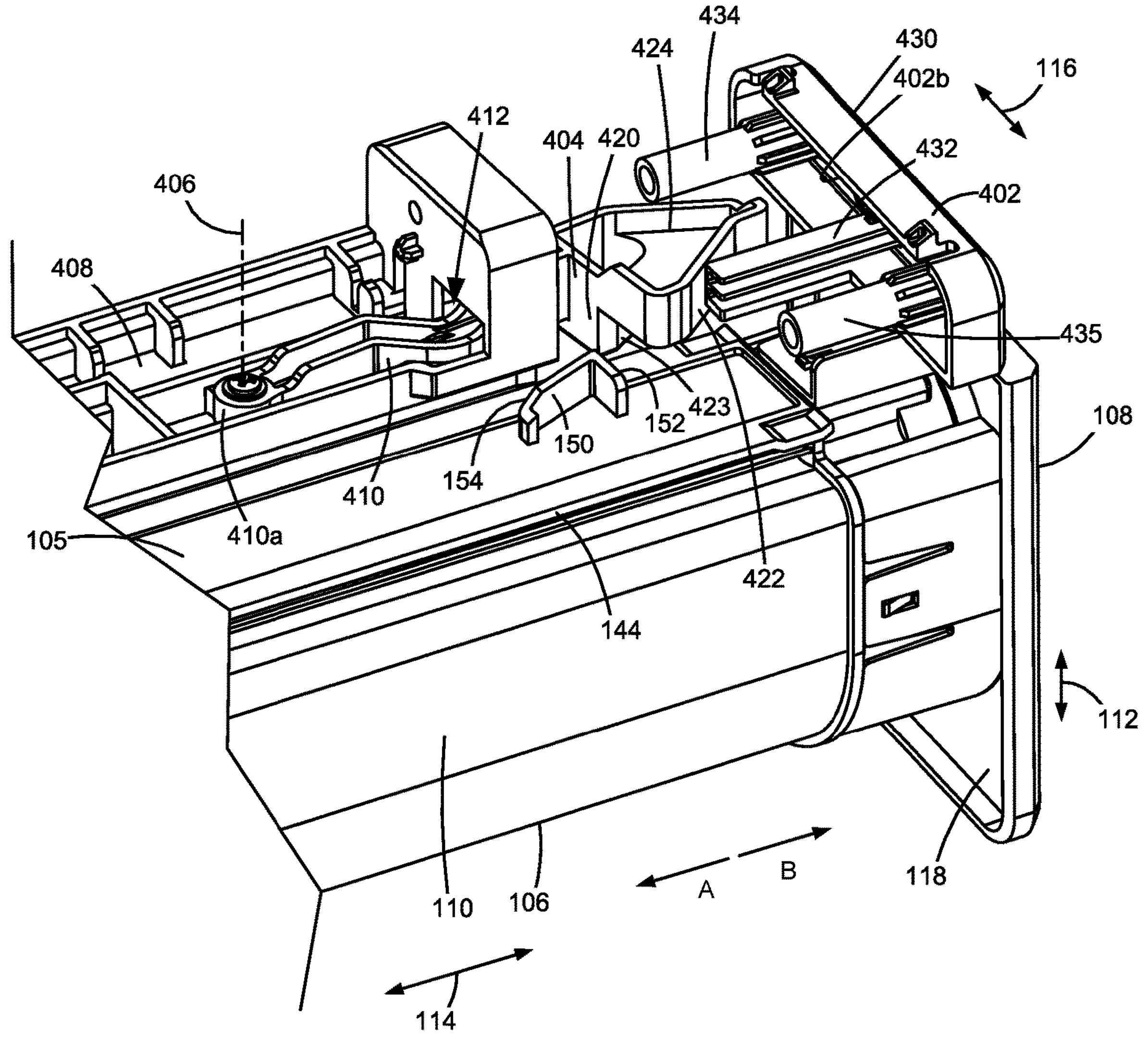
FIG. 11 is a perspective view of the latch of the image forming device in an unlatching position, permitting removal of the toner cartridge from the image forming device according to one example embodiment.

Latch 404 is movable between a latching position shown in FIGS. 7-10 and an unlatching position shown in FIG. 11. In the example embodiment illustrated, latch 404 is positioned adjacent to top 105 of body 104 of toner cartridge 100. In this example embodiment, latch 404 is pivotable about a pivot axis 406 between the latching position and the unlatching position. In the example embodiment illustrated, pivot axis 406 is substantially vertical. A retainer 408 locates and defines the range of motion of latch 404. In the example embodiment illustrated, latch 404 includes an arm 410 having a first end 410*a* that is pivotally mounted to retainer 408. Arm 410 passes through a guide slot 412 formed in retainer 408. The surfaces of retainer 408 forming guide slot 412 include a first stop 414 and a second stop 415 that limit the range of pivoting motion of latch 404 from the latching position to the unlatching position and vice versa, respectively.

Figure 8:
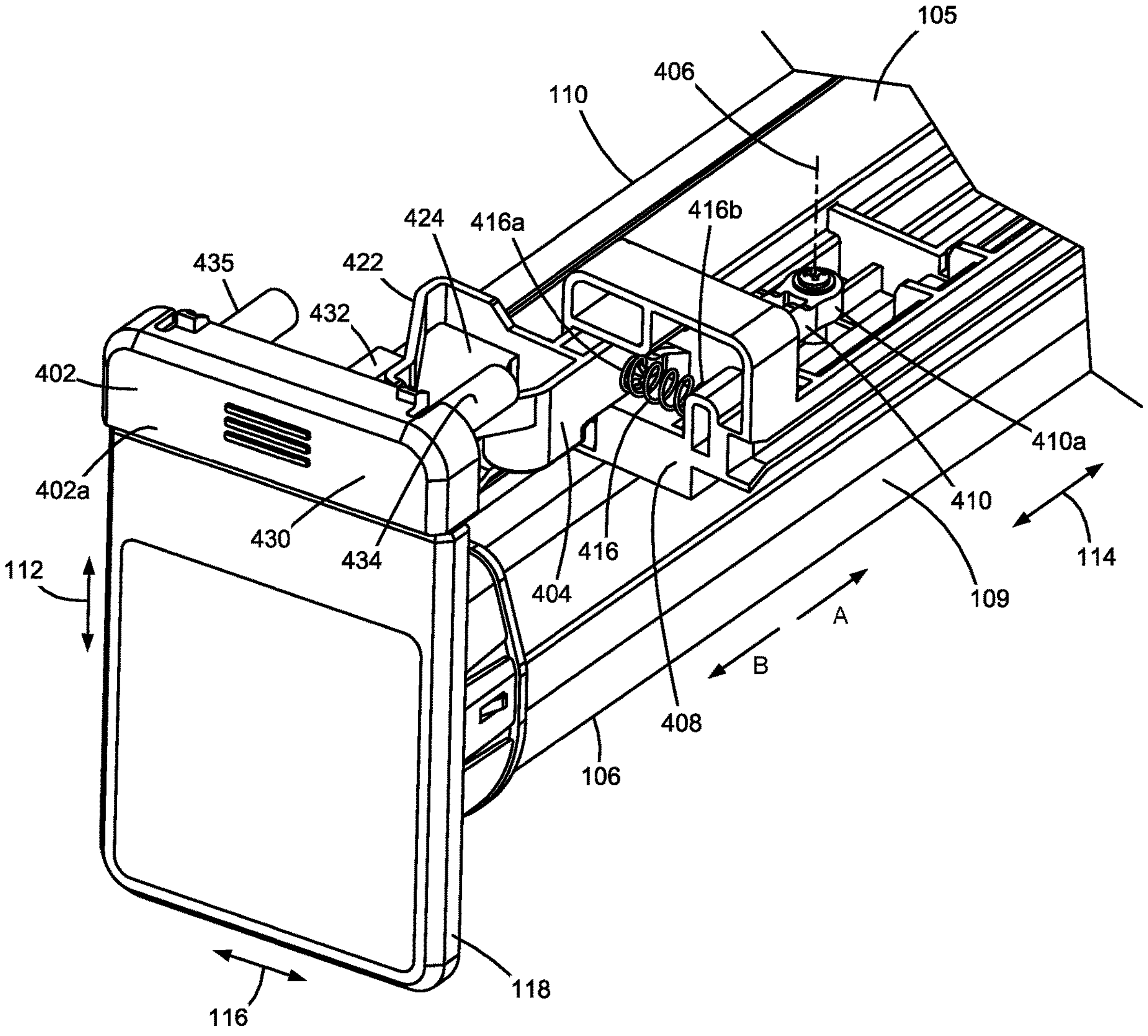

In the example embodiment illustrated, latch 404 is biased toward the latching position. For example, as shown in FIG. 8, a compression spring 416 has a first end 416*a* in contact with arm 410 of latch 404 and a second end 416*b* in contact with retainer 408, Bosses may be formed on surfaces of latch 404 and retainer 408 in order to retain spring 416, as desired. While the example embodiment illustrated includes a compression spring 416, it will be appreciated that any suitable biasing member may be used, as desired, such as, for example, one or more extension springs, torsion springs, leaf springs, or materials having resilient properties.

Figure 12A:
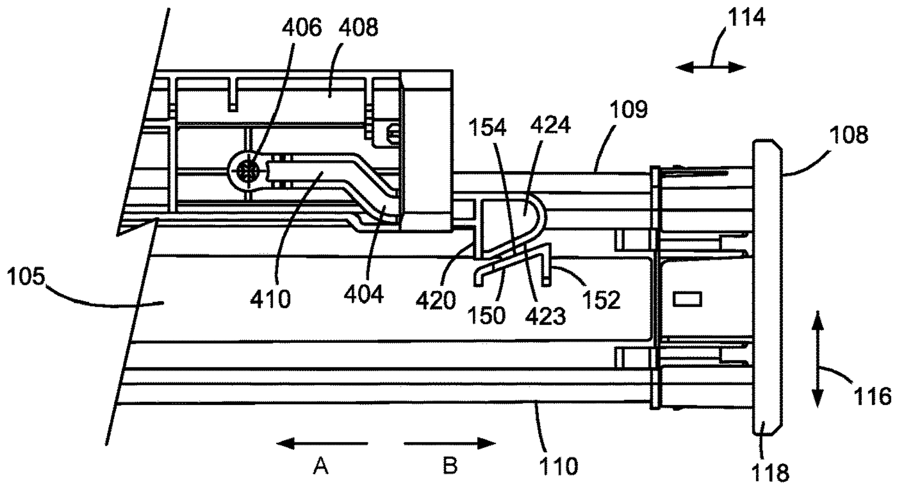
FIGS. 12A-12C are sequential top views showing the interaction between a camming surface of the latch catch of the toner cartridge and a corresponding camming surface of the latch of the image forming device during insertion of the toner cartridge into the image forming device according to one example embodiment.
Figure 12B:
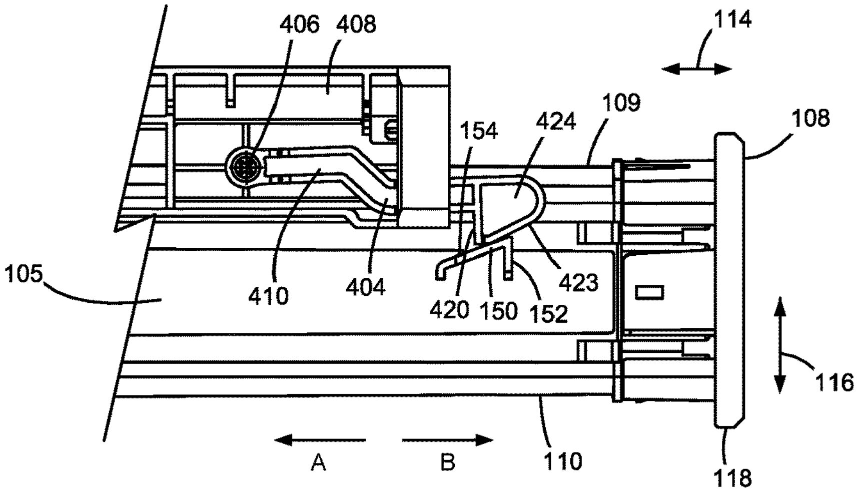
Figure 12C:
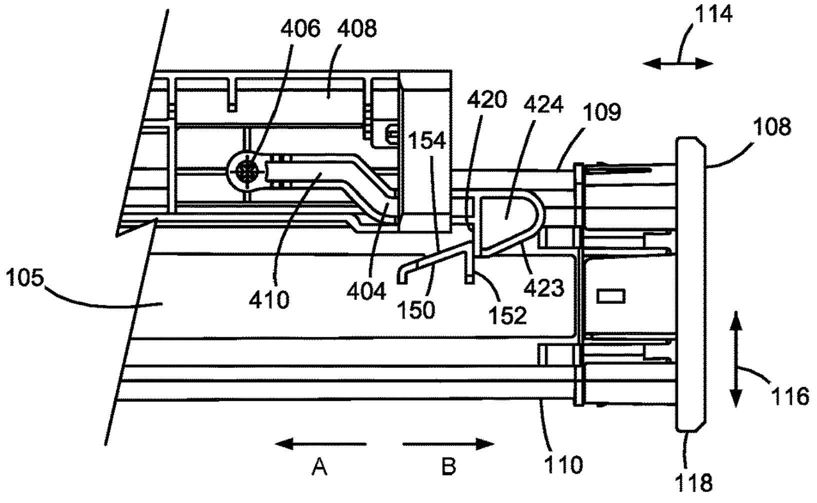

In the example embodiment illustrated, latch 404 includes a latching surface 420, a first camming surface 422 and a second camming, surface 423 (also shown in FIGS. 12A-12C). In this embodiment, latching surface 420 and camming surfaces 422, 423 are positioned on a head 424 formed at a second end of arm 410 of latch 404. Latching surface 420 is positioned to contact catch surface 152 of latch catch 150 of toner cartridge 100 when latch 404 is in the latching position and toner cartridge 100 is installed in image forming device 20 in order to restrain toner cartridge 100 along longitudinal dimension 114. Camming surface 422 is positioned to receive a camming force to move latch 404 from the latching position to the unlatching position in order to release toner cartridge 100 from image forming device 20, and camming surface 423 is positioned to receive a camming force to move latch 404 from the latching position to the unlatching position in order to permit insertion of toner cartridge 100 into image forming device 20. While the example embodiment illustrated includes a pair of camming surfaces 422, 423, other embodiments may include a single camming, surface.

In the example embodiment illustrated, latching surface 420 is substantially orthogonal to the longitudinal dimension 114 of toner cartridge 100 when latch 404 is in the latching position. In this embodiment, camming, surfaces 422, 423 are each angled relative to the longitudinal dimension 114 of toner cartridge 100 when latch 404 is in the latching position such that camming surfaces 422, 423 extend from side 109 of body 104 toward side 110 of body 104 along the direction of insertion A of toner cartridge 100 into image forming device 20, in a direction from rear end 108 of body 104 toward front end 107 of body 104.

Figure 7:
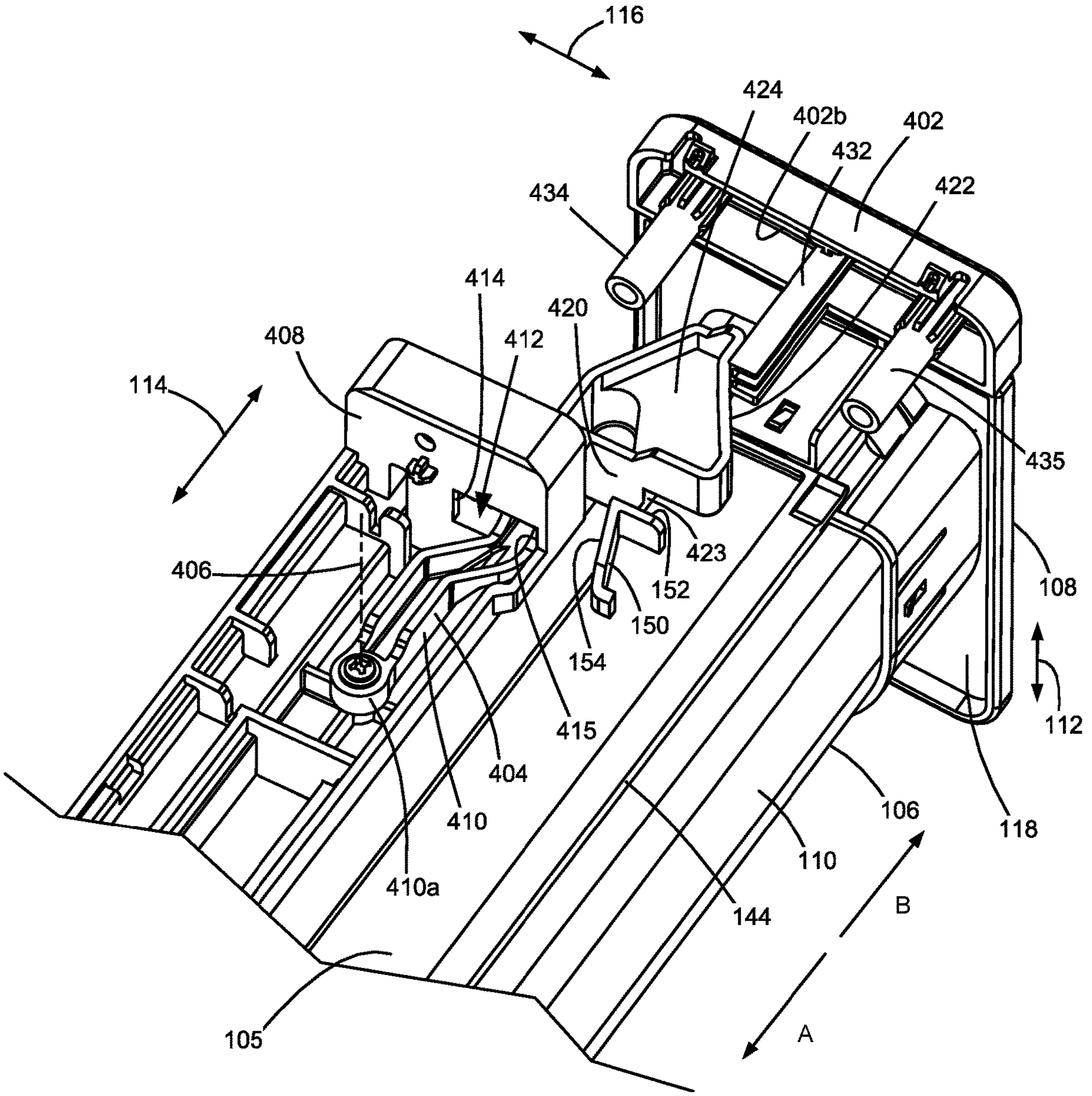
FIGS. 7-10 are perspective views of a latch of the image forming device in a latching position, engaged with the latch catch of the toner cartridge according to one example embodiment.

With reference to FIGS. 7, 9 and 10, when latch 404 is in the latching position and toner cartridge 100 is installed in image forming device 20, latching surface 420 is positioned in the path of catch surface 152 of latch catch 150 of toner cartridge 100 in the direction of removal B of toner cartridge 100 from image forming device 20, in a direction along longitudinal dimension 114 from front end 107 of body 104 toward rear end 108 of body 104. In the example embodiment illustrated, when toner cartridge 100 is installed in image forming device 20, toner cartridge 100 tends to be biased along longitudinal dimension 114 in a direction from front end 107 of body 104 toward rear end 108 of body 104, i.e., in the direction of removal B of toner cartridge 100 from image forming device 20, by various elements. These forces include, for example, a force imparted on drive coupler 126 of toner cartridge 100 by the corresponding drive coupler in image forming device 20, a spring force of spring 125 of shutter 124 of toner cartridge 100 when shutter 124 is in the open position and toner cartridge 100 is installed in image forming device 20, and a spring force of a corresponding shutter on the inlet port of developer unit 200 that receives toner from outlet port 122 of toner cartridge 100. The forces imparted on toner cartridge 100 along longitudinal dimension 114 press catch surface 152 of latch catch 150 against corresponding latching surface 420 of latch 404 such that contact between catch surface 152 of latch catch 150 and latching surface 420 of latch 404 restrains toner cartridge 100 along longitudinal dimension 114 when toner cartridge 100 is installed in image forming device 20 and controls the position of toner cartridge 100 along longitudinal dimension 114 during operation.

With reference to FIGS. 6-11, latch actuator 402 is movable between a home position shown in FIGS. 6-10 and an actuating position shown in FIG. 11. In the example embodiment illustrated, latch actuator 402 generally translates along longitudinal dimension 114 of toner cartridge 100 between the home position and the actuating position. Latch actuator 402 includes a user contact surface or touch-point 430 on an outer side 402*a* of latch actuator 402 that is exposed to the user, for example, immediately above a top edge of rear end 108 of body 104 of toner cartridge 100, when access door 400 of image forming device 20 is in an open position, allowing a user to actuate latch actuator 402 and move latch actuator 402 from the home position to the actuating position to move latch 404 from the latching position to the unlatching position to release toner cartridge 100 from image forming device 20.

With reference to FIGS. 7-11, latch actuator 402 includes an engagement member 432 on an inner side 402*b* of latch actuator 402 that is positioned to contact camming surface 422 of latch 404 upon latch actuator 402 receiving an actuation force and moving from the home position to the actuating position in order to move latch 404 from the latching position to the unlatching position to release toner cartridge 100, In the example embodiment illustrated, engagement member 432 includes a finger or other form of projection that extends generally along longitudinal dimension 114 of toner cartridge 100 from inner side 402*b* of latch actuator 402 in the direction of insertion A of toner cartridge 100 into image forming device 20, toward front end 107 of body 104. In the example embodiment illustrated, latch actuator 402 also includes alignment guides 434, 435 extending from inner side 402*b* of latch actuator 402. Alignment guides 434, 435 are received by corresponding alignment features in image forming device 20 in order to guide the movement of latch actuator 402 along longitudinal dimension 114 of toner cartridge 100 between the home position and the actuating position. Latch actuator 402 may be biased toward the home position by a suitable biasing member, such as, for example, a compression spring or the like, as desired.

With reference to FIG. 11, when latch actuator 402 moves from the home position toward the actuating position, for example, when a user contacts touchpoint 430 and pushes latch actuator 402 inward, i.e., along direction of insertion A of toner cartridge 100 into image forming device 20 and along longitudinal dimension 114 of toner cartridge 100 in a direction from rear end 108 of body 104 toward front end 107 of body 104, engagement member 432 of latch actuator 402 contacts camming surface 422 of latch 404. Contact between engagement member 432 of latch actuator 402 and camming surface 422 of latch 404 as latch actuator 402 moves from the home position toward the actuating position causes latch 404 to pivot about pivot axis 406 from the latching position toward the unlatching position.

When latch 404 pivots from the latching position shown in FIGS. 7-10 to the unlatching position shown in FIG. 11, latching surface 420 moves toward side 109 of body 104, out of the path of catch surface 152 of latch catch 150 of toner cartridge 100, allowing a user to remove toner cartridge 100 from image forming device 20 by pulling toner cartridge 100 from rear end 108 of body 104, for example, from end cap 118, along direction of removal B of toner cartridge 100. In the example embodiment illustrated, when latching surface 420 of latch 404 moves clear of the path of catch surface 152 of latch catch 150 of toner cartridge 100, the forces acting on toner cartridge 100 in the direction of removal B of toner cartridge 100 tend to cause toner cartridge 100 to move along longitudinal dimension 114 in a direction from front end 107 of body 104 toward rear end 108 of body 104 in a manner that presents rear end 108 of body 104 to the user and assists the user with removal of toner cartridge 100 from image forming device 20, The movement of toner cartridge 100 in the direction of removal B of toner cartridge 100 from image forming device 20 when latching surface 420 of latch 404 clears the path of catch surface 152 of latch catch 150 also causes catch surface 152 to travel past latching surface 420 in a direction from front end 107 of body 104 toward rear end 108 of body 104 such that camming surface 423 of latch 404 contacts camming surface 154 of latch catch 150 of toner cartridge 100 and maintains latch 404 in the unlatching position to help facilitate the removal of toner cartridge 100 from image forming device 20.

FIGS. 12A-12C are sequential views showing the interaction between latch catch 150 of toner cartridge 100 and latch 404 of image forming device 20 during insertion of toner cartridge 100 into image forming device 20 along direction of insertion A. FIG. 12A shows latch 404 of image forming device 20 in the latching position and camming surface 154 of latch catch 150 of toner cartridge 100 approaching camming surface 423 of latch 404 as toner cartridge 100 advances in the direction of insertion A of toner cartridge 100 into image forming device 20. As shown in FIG. 12A, when latch 404 is in the latching position, camming surface 423 of latch 404 is positioned in the path of camming surface 154 of latch catch 150 of toner cartridge 100. As toner cartridge 100 advances further in direction of insertion A from the position shown in FIG. 12A, camming surface 154 of latch catch 150 of toner cartridge 100 contacts camming surface 423 of latch 404. Contact between camming surface 154 of latch catch 150 and camming surface 423 of latch 404 as toner cartridge 100 advances in direction of insertion A causes latch 404 to move from the latching position toward the unlatching position as shown in FIG. 12B in order to clear latch 404 from the insertion path of latch catch 150 to permit installation of toner cartridge 100 in image forming device 20. As toner cartridge 100 advances further in direction of insertion A from the position shown in FIG. 12B and nears the final installed position of toner cartridge 100 in image forming device 20, camming surface 154 of latch catch 150 moves clear of camming surface 423 of latch 404 causing latch 404 to return to the latching position as a result of the bias applied to latch 404 by spring 416, as shown in FIG. 12C. When camming surface 154 of latch catch 150 clears camming surface 423 of latch 404 during insertion of toner cartridge 100 into image forming device 20 and latch 404 returns to the latching position, latching surface 420 of latch 404 is positioned in the path of catch surface 152 of latch catch 150 of toner cartridge 100, restraining toner cartridge 100 in the direction of removal B and along longitudinal dimension 114 of toner cartridge 100 as discussed above.

Although the example embodiment shown in FIG. 1 includes toner cartridges 100, developer units 200 and PC units 300 positioned in separate replaceable units, it will be appreciated that the replaceable unit(s) of image forming device 20 may employ any suitable configuration as desired. For example, in one embodiment, the main toner supply for image forming device 20, developer unit 200 and PC unit 300 are combined in a separate replaceable unit for each color toner. In another embodiment, the main toner supply for image forming device 20 and developer unit 200 are provided in a first replaceable unit and PC unit 300 is provided in a second replaceable unit. Other combinations are possible without departing from the scope of the present disclosure.

Further, although the example image forming device 20 discussed above includes four toner cartridges 100 and corresponding developer units 200 and PC units 300, more or fewer replaceable units may be used depending on the color options needed. For example, in one embodiment, the image forming device includes a single toner cartridge and corresponding developer unit and PC unit in order to permit monochrome printing.

The foregoing description illustrates various aspects of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

The invention claimed is:

1. A toner container for use in an image forming device, comprising:

a body having a top, a bottom, a first side and a second side positioned between a first longitudinal end and a second longitudinal end of the body, the first longitudinal end of the body leads during insertion of the toner container into the image forming device and the second longitudinal end trails during insertion of the toner container into the image forming device, a longitudinal dimension of the toner container extends between the first longitudinal end of the body and the second longitudinal end of the body, the body has a reservoir for holding toner;

an outlet port on the bottom of the body for exiting toner from the toner container, the outlet port is positioned closer to the first longitudinal end of the body than to the second longitudinal end of the body;

a drive coupler on the first longitudinal end of the body for mating with a corresponding drive coupler in the image forming device when the toner container is installed in the image forming device for receiving rotational motion from the corresponding drive coupler in the image forming device; and a latch catch projecting upward on the top of the body, the latch catch is spaced from the second longitudinal end of the body and positioned closer to the second longitudinal end of the body than to the first longitudinal end of the body, the latch catch includes a first contact surface that faces toward the second longitudinal end of the body for contacting a first corresponding surface of a latch in the image forming device to restrain the toner container along the longitudinal dimension of the toner container in a direction from the first longitudinal end of the body toward the second longitudinal end of the body when the toner container is in an installed position in the image forming device.

2. The toner container of claim 1, wherein the latch catch includes a second contact surface for contacting a second corresponding surface of the latch in the image forming device during insertion of the toner container into the image forming device to move the latch in the image forming device clear of the latch catch to permit installation of the toner container in the image forming device, the second contact surface of the latch catch is positioned closer to the first longitudinal end of the body than the first contact surface of the latch catch is to the first longitudinal end of the body.

3. The toner container of claim 2, wherein the second contact surface of the latch catch faces toward the first longitudinal end of the body and the first side of the body.

4. The toner container of claim 2, wherein the second contact surface of the latch catch is angled relative to the first contact surface of the latch catch and the longitudinal dimension of the toner container.

5. The toner container of claim 2, wherein the second contact surface of the latch catch extends toward the first longitudinal end of the body from the first contact surface of the latch catch.

6. The toner container of claim 1, wherein the outlet port and the latch catch are positioned closer to the first side of the body than to the second side of the body.

7. The toner container of claim 1, wherein the first contact surface of the latch catch is orthogonal to the longitudinal dimension of the toner container.

8. A toner container for use in an image forming device, comprising:

a body having a top, a bottom, a first side and a second side positioned between a first longitudinal end and a second longitudinal end of the body, the first longitudinal end of the body leads during insertion of the toner container into the image forming device and the second longitudinal end trails during insertion of the toner container into the image forming device, a longitudinal dimension of the toner container extends between the first longitudinal end of the body and the second longitudinal end of the body, the body has a reservoir for holding toner;

an outlet port on the bottom of the body for exiting toner from the toner container, the outlet port is positioned closer to the first longitudinal end of the body than to the second longitudinal end of the body, the outlet port is positioned closer to the first side of the body than to the second side of the body;

a drive coupler on the first longitudinal end of the body for mating with a corresponding drive coupler in the image forming device when the toner container is installed in the image forming device for receiving rotational motion from the corresponding drive coupler in the image forming device; and a latch catch on the top of the body, the latch catch is positioned closer to the second longitudinal end of the body than to the first longitudinal end of the body, the latch catch includes a first contact surface that faces toward the second longitudinal end of the body and that is unobstructed to contact a first corresponding surface of a latch in the image forming device to restrain the toner container along the longitudinal dimension of the toner container in a direction from the first longitudinal end of the body toward the second longitudinal end of the body when the toner container is in an installed position in the image forming device, the latch catch includes a second contact surface that is unobstructed to contact a second corresponding surface of the latch in the image forming device during insertion of the toner container into the image forming device to move the latch in the image forming device clear of the latch catch to permit installation of the toner container in the image forming device, the second contact surface of the latch catch is positioned closer to the first side of the body than to the second side of the body.

9. The toner container of claim 8, wherein the latch catch projects upward on the top of the body.

10. The toner container of claim 8, wherein the second contact surface of the latch catch is positioned closer to the first longitudinal end of the body than the first contact surface of the latch catch is to the first longitudinal end of the body.

11. The toner container of claim 8, wherein the second contact surface of the latch catch faces toward the first longitudinal end of the body and the first side of the body.

12. The toner container of claim 8, wherein the second contact surface of the latch catch is angled relative to the first contact surface of the latch catch and the longitudinal dimension of the toner container.

13. The toner container of claim 8, wherein the second contact surface of the latch catch extends toward the first longitudinal end of the body from the first contact surface of the latch catch.

14. The toner container of claim 8, wherein the first contact surface of the latch catch is orthogonal to the longitudinal dimension of the toner container.

15. A toner container for use in an image forming device, comprising:

a body having a top, a bottom, a first side and a second side positioned between a first longitudinal end and a second longitudinal end of the body, the first longitudinal end of the body leads during insertion of the toner container into the image forming device and the second longitudinal end trails during insertion of the toner container into the image forming device, a longitudinal dimension of the toner container extends between the first longitudinal end of the body and the second longitudinal end of the body, the body has a reservoir for holding toner;

an outlet port on the bottom of the body for exiting toner from the toner container, the outlet port is positioned closer to the first longitudinal end of the body than to the second longitudinal end of the body, the outlet port is positioned closer to the first side of the body than to the second side of the body;

a drive coupler on the first longitudinal end of the body for mating with a corresponding drive coupler in the image forming device when the toner container is installed in the image forming device for receiving rotational motion from the corresponding drive coupler in the image forming device; and a latch catch on the top of the body, the latch catch is spaced from the second longitudinal end of the body and positioned closer to the second longitudinal end of the body than to the first longitudinal end of the body, the latch catch includes a catch surface that faces toward the second longitudinal end of the body, the catch surface of the latch catch is oriented closer to orthogonal to the longitudinal dimension of the toner container than to parallel to the longitudinal dimension of the toner container, the latch catch includes a camming surface that faces toward the first longitudinal end of the body and the first side of the body, the camming surface of the latch catch is angled relative to the catch surface of the latch catch and the longitudinal dimension of the toner container, the camming surface of the latch catch is positioned closer to the first longitudinal end of the body than the catch surface of the latch catch is to the first longitudinal end of the body, the camming surface of the latch catch is positioned closer to the first side of the body than to the second side of the body.

16. The toner container of claim 15, wherein the latch catch projects upward on the top of the body.

17. The toner container of claim 15, wherein the camming surface of the latch catch extends toward the first longitudinal end of the body from the catch surface of the latch catch.

18. The toner container of claim 15, wherein the catch surface of the latch catch is orthogonal to the longitudinal dimension of the toner container.

19. The toner container of claim 15, wherein the camming surface of the latch catch is oriented closer to parallel to the longitudinal dimension of the toner container than to orthogonal to the longitudinal dimension of the toner container.

* * * * *